(12) United States Patent
Collier et al.

(10) Patent No.: US 6,520,068 B1
(45) Date of Patent: Feb. 18, 2003

(54) ACTUATOR WITH SEALING ASSEMBLY

(76) Inventors: Greg Collier, 210 Cousteau Pl., Davis, CA (US) 95616; William Klassen, 210 Cousteau Pl., Davis, CA (US) 95616; Andy Lyons, 210 Cousteau Pl., Davis, CA (US) 95616; Chris McIlwain, 210 Cousteau Pl., Davis, CA (US) 95616; Jeff Prince, 210 Cousteau Pl., Davis, CA (US) 95616; Tyler Schilling, 210 Cousteau Pl., Davis, CA (US) 95616; Pat Whelan, 210 Cousteau Pl., Davis, CA (US) 95616

( * ) Notice: Subject to any disclaimer, the term of this patent is extended or adjusted under 35 U.S.C. 154(b) by 0 days.

(21) Appl. No.: 09/520,562

(22) Filed: Mar. 8, 2000

Related U.S. Application Data

(60) Provisional application No. 60/125,215, filed on Mar. 18, 1999.

(51) Int. Cl.[7] .................................................. F01C 9/00
(52) U.S. Cl. .......................................... 92/124; 92/125
(58) Field of Search ........................ 92/121, 124, 125, 92/122, 123

(56) References Cited

U.S. PATENT DOCUMENTS

| | | | | |
|---|---|---|---|---|
| 2,954,012 A | * | 9/1960 | Curtis et al. ................... | 92/125 |
| 3,021,822 A | * | 2/1962 | Rumsey ........................ | 92/125 |
| 3,032,020 A | * | 5/1962 | Sneen ........................... | 92/125 |
| 3,215,046 A | * | 11/1965 | Drake ........................... | 92/125 |
| 3,682,050 A | * | 8/1972 | Hyde ............................ | 92/125 |
| 3,839,945 A | | 10/1974 | Jacobellis | |
| 3,937,130 A | * | 2/1976 | Adams et al. ................ | 92/125 |
| 4,774,875 A | | 10/1988 | Amshoff, III | |
| 4,823,678 A | | 4/1989 | Sollami | |
| 5,492,051 A | * | 2/1996 | Schiffler et al. ............... | 92/125 |

FOREIGN PATENT DOCUMENTS

| | | | |
|---|---|---|---|
| WO | 98/58178 | * | 12/1998 |

\* cited by examiner

*Primary Examiner*—F. Daniel Lopez
(74) *Attorney, Agent, or Firm*—Peninsula IP Group; Douglas A. Chaikin

(57) ABSTRACT

Disclosed herein is a rotary vane actuator device with sealing assembly. The device includes a housing and a sealing assembly. The housing has a center opening defining a chamber. The housing includes opposing end plates for surrounding a stator. The stator having an aligned center opening and a rotor within the chamber. Within the chamber there are two openings, one serving as an inlet, the other serving as an outlet for rotational fluid. The rotor includes a vane assembly fixedly connected thereto. When the fluid enters the chamber, the fluid contacts the vane and moves the rotationally in the same direction. Each of the stator and the vane include seal packs. The end plates include sealing members which contact the stator and vane seal packs whether in the static or dynamic condition of the rotor. The combination of the seal packs and the end plate seal form the sealing assembly.

10 Claims, 4 Drawing Sheets

ACTUATOR WITH SEALING ASSEMBLY

This application claims the benefit of provisional application No. 60/125,215, filed Mar. 18, 1999.

BACKGROUND OF THE INVENTION

Field of the Invention

This invention relates to an actuator device and more particularly to a high pressure rotary vane actuator device wherein the vanes of the rotor are moved by fluid under high pressure.

Rotary vane actuators are used as an essential part of some robotic devices. When connected with a series of servomotors and drives and using the proper electromechanical principles and devices, such vane actuators are essential to the entire robotic device. For example, some robotic arms, such Alstom Automation Schilling Robotics' Orion manipulator have as many as seven joints. Such robotic arms employ a ported rotary vane actuator having a like number of ports. Each joint is connected to one or more ports and a valve for moving each joint separately and/or conjunctively depending on the user's desires.

An important use of such robotic arms is for submersible exploration. For example, exploring to find oil or other minerals and deposits requires exploration of undersea areas. A robotic arm is attached to either a manned or unmanned submersible. The sea bottom can then be explored as if a man were walking on the ocean bottom instead of being safely on a ship or in the submersible. The robotic arm must be able to work in difficult and even treacherous environments whose is ecology is highly sensitive to pollution, especially hydro carbons found in oil leaks.

In order for these robotic arms to function properly, the rotor is rotated by fluid under extremely high pressure. The rotating fluid is typically under pressures of 3000 pounds per square inch (PSI) ambient as is known for such devices. The adverse environmental conditions also create working difficulties. For example pressures at up to 13,000 PSI gage on the ocean floor are experienced during operation of the robotic arms.

As noted above, the robotic arm typically works in environments having sensitive ecology, which are subject to close political scrutiny. It is consequently unacceptable for the rotating fluid to leak into such environments. Great care must be taken to ensure that there is no fluid leakage even under the extreme conditions presented by environments such as the North Sea, for example. Also, the pressure within the actuator must likewise not give rise to any leakage.

Additionally, any leakage of fluid in the actuator will cause the robotic device to be moved freely without operator activation. When there is a drop in fluid pressure due to such leakage there will be play in the affected joint. This means that the arm joint can move by the forces of its surroundings. Given the gravitational forces acting upon the robotic device, the affected robotic arm can move freely, destroying the ability of the robotic device to remain stationary when electrical and/or hydraulic power is turned off. A submersible is, by design, tightly packed with sensitive and crucial instruments and devices. If a robotic device were to move when turned off, these sensitive and crucial instruments and devices may be damaged. This to is an unacceptable condition and one which requires the actuator to be as nearly leak proof as possible.

Various devices have been aimed at resolving the leakage issue in rotary vane actuator devices with limited success. For example, in U.S. Pat. No. 4,510,850, attempts are made to place a seal between the end walls of the vane and the actuator housing. In this embodiment the vane seals are linear and attempt to match seal length with the seal between the vane seal and actuator housing.

In U.S. Pat. No. 4,495,856, a body sleeve houses a stator and a rotary vane. The rotary vane extends radially from the drive shaft is seals are placed at either end of the drive shaft where it is secured by a pair of head assemblies. The body sleeve includes metal end plates at either end of the head assemblies which are designed to retain tapered, roller thrust bearings within the head assemblies. By tapering, the potential leak path becomes narrower and then can be filled with sealing materials. However, the machining and consequently manufacturing costs may be quite high and even prohibitive for providing this type of arrangement.

In U.S. Pat. No. 4,565,119, there is disclosed a vane-type rotary actuator employing a disc like seal member made of an elastic material with a center opening. The vanes here appear to use one or more elastomeric O-rings to make continuous contact with the with a cylinder. However, this disclosure does appear not address the potential leak path between the ports or the end plates.

In order to perfect a seal in any of the above devices or any known device, special attention to manufacturing detail may cause the actuator to become so expensive and difficult to manufacture as to be useless. Tolerances required between flat surface seals and a matching of lengths of flat surface seals are difficult if not impossible to accomplish consistently using traditional economically acceptable and known manufacturing techniques.

What is needed is an actuator which lends itself to known manufacturing techniques and provides the actuator with virtually no leak paths. Such an actuator must neither leak internally (port to port) nor externally, chamber to environment. The desired actuator would cost no more to manufacture than known actuators and would add to the effective and efficient operation of the device of which it was a part.

SUMMARY OF THE INVENTION

It is an object of this invention to provide a rotary vane actuator device that provides three dimensional sealing whether the actuator is static or dynamic.

It is an additional object of this invention to provide such an actuator device that minimizes the potential leak paths using system sealing assemblies positioned within the chamber of rotation and at least partially external thereto.

It is an additional object of this invention to provide such an actuator device which is manufactured using traditional methods and equipment.

In accordance with the above objects and those that will be mentioned and will become apparent below, the rotary vane actuator device in accordance with this invention comprises:

A rotary vane actuator comprising:
- an housing having at least one opening for allowing fluid into and out of the housing:
- a first and a second cylindrical end plates
- a stator housing between the end plates, the stator housing having with a central opening and when assembled with the end plates defining a chamber, that includes a stator fixedly located on the stator housing [and being in central opening; and
- a rotor within the central opening and journaled by the housing for rotational movement of the rotor relative to the stator, the rotor including a vane assembly for facilitating movement of the rotor upon flow of fluid into and out of the chamber; and a sealing assembly including:
  a removable multi-element stator seal pack removably positioned between the first and second members of the stator;
  a removable multi-element vane pack that securely fits into the machined depressions of the rotor and a removable multi-element seal assembly; and
  each end plate having an end plate seal inside the central opening of the stator housing and between the end plates; and
the rotor, said stator seal pack, rotor seal pack and end plate seals being in mating relationship to each other, thereby preventing fluid bypass from the chamber into the ports or into the environment and wherein upon assembly of the actuator device, at least a portion of the end plate seal is within the chamber.

With the actuator described above, a three dimensional sealing system is provided which seals potential leak paths from port to port, from port to the environment and from the chamber to the environment. Each of these potential leak paths is blocked by at least one of the seals described above.

In a preferred embodiment of the actuator in accordance with the invention, each of the seal packs includes a vane seal and each of the vane seals and the end plate seal are made from a plastic material. Preferably, the vane seals are made from polyurethane and the end plate seal is made from a high strength plastic such as Delrin® and Kynar®.

In another preferred embodiment, the end plate seals are at least partially within the chamber and fixed from falling into the chamber. Preferably the end plate seal has an open center and is force fit over the rotor and on either side where the end plates fit with the rotor squeezing the end plate therebetween.

It is an advantage of this invention to provide a system of compatible plastic seals which when in contact with one another provides a fluid proof seal.

It is an additional advantage of this invention to provide an actuator, which features end plate seals that are at least partially within the chamber.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
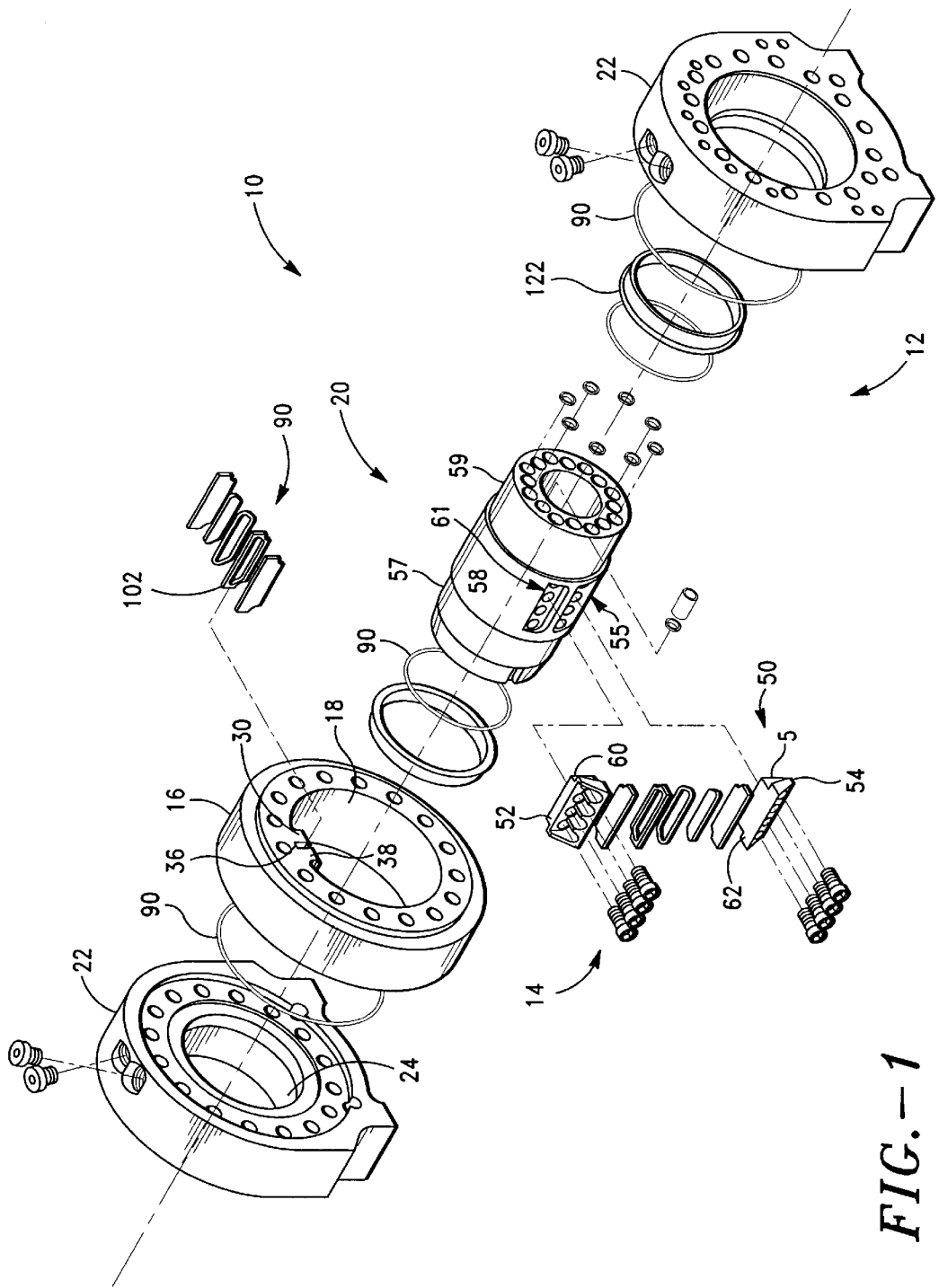
FIG. 1 is a perspective plan view of one embodiment of the rotary actuator device in accordance with the invention.

The invention will now be described with reference to FIG. 1, which illustrates a preferred embodiment of the invention, a rotary actuator device, shown generally by the numeral 10. The rotary actuator device 10 includes a housing assembly, generally indicated by the numeral 12 (FIG. 2) and a sealing assembly generally indicated by the numeral 14. The details of each assembly 12 and 14 are set forth below.

The housing assembly 12 includes a stator housing 16 and a set of end plates 22, each having a centered cylindrical bore 18, 24, respectively. As FIG. 1 shows, when the end plates 22 are securely fitted to either side of the stator housing 16 and the cylindrical bores 18, 24 of the stator housing and the end plates 22 are properly aligned, it creates a chamber 26 that encloses a cylindrical rotor 20. As FIG. 1 also shows, the rotor 20 is a machined cylindrical component consisting of a first cylindrical shaft element 57, a second cylindrical shaft element 59 and a centered cylindrical machined surface 58 that includes a set of machined depressions 55, 61 that have been cut into its surface. The diameter and linear dimension of the first and second cylindrical shaft elements 57, 59 are equivalent to the diameter and depth of the cylindrical bore 18 in each end plate 22. By properly installing and positioning a cylindrical shaft element 57, 59 in the centered cylindrical bore 18 of each end plate, it insures that the rotor is able to freely rotate in both in a clockwise and counterclockwise direction relative to the stator housing 16.

Figure 3:
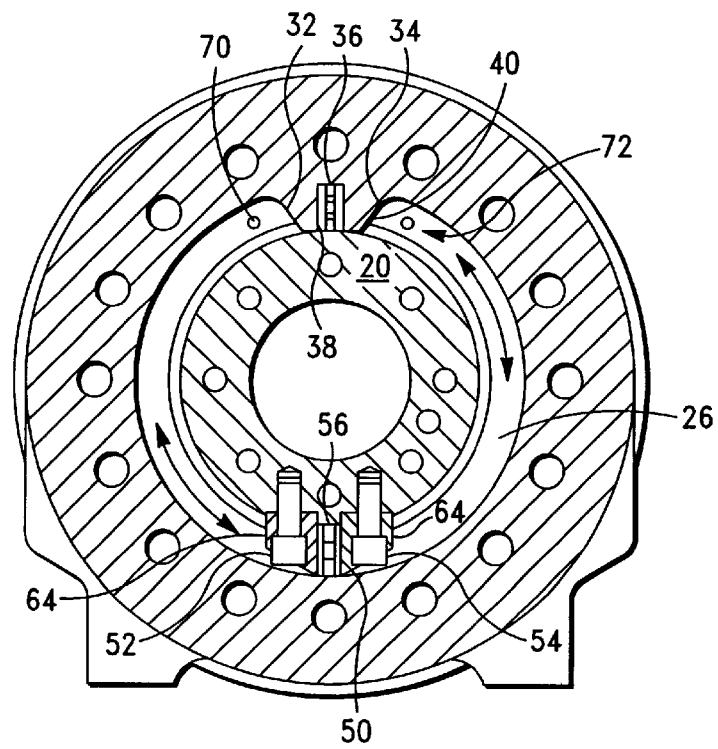
FIG. 3 is another sectional plan view of the embodiment of the rotary actuator device in accordance with the invention shown in FIG. 1 illustrating the stator in relationship to the rotor within the chamber.

As shown in FIGS. 1 and 3, the stator assembly 16 includes a stator 30 in the central opening 18. The stator 30 includes a first member 32 and a second member 34 and a groove 36 in-between the members 32 and 34. Each of the members 32 and 34 acts as stops for the rotor 20 and prevents further rotational movement of the rotor 20 as will become more apparent with respect to the detailed description of the rotor 20 operation below. The inside lateral surfaces 38 of each of the members 32 and 34 are opposed and define the groove 36.

The outside lateral surfaces 40 of the members 32 and 34 provide the stops for the rotor 20. The outside lateral surfaces 40 serve as abutment members for the rotor vane as will be more fully appreciated below.

Figure 2:
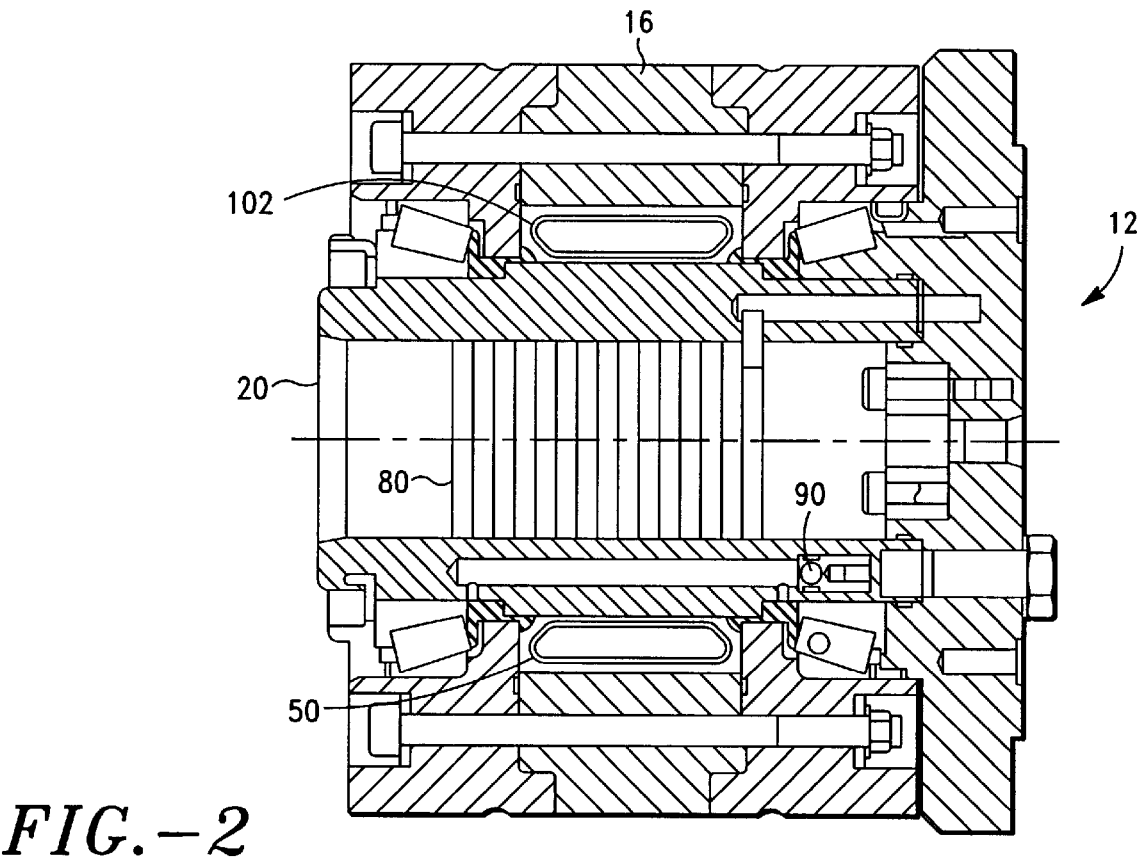
FIG. 2 is a sectional plan view of the embodiment of the actuator device in accordance with the invention shown in FIG. 1 illustrating the rotor in the chamber.

The rotor 20 includes a vane assembly 50 secured to the outside surface as clearly shown in FIGS. 1, 2 and 3. The vane assembly 50 includes first and second vanes 52 and 54 and a groove 56 defined there between. As shown in FIG. 1 each of the vanes 52, 54 are secured in a set of machined depressions 55, 61 cut into the remaining cylindrical machined surface 58 of the rotor 20. Each of the vanes 52 and 54 also includes a similar shaped machine surface 60 for mating with the machined depressions 55, 61 cut into the cylindrical machined surface 58 of the rotor 20.

The oppose inside surfaces 62 of the vanes 52 and 54 define the groove 56. The outer surfaces 64 of the vane 50 serve as stops. The surfaces 64 abut against compatible surfaces 40 of the stator 30, alternatively during full rotation. As can be seen in FIG. 3, the abutment surfaces 40 and 64 prevent 360° through rotation and instead provide approximately 270° of rotation.

As seen in FIG. 2, the rotor 20 is journaled for rotation within the housing assembly 12. The rotor 20 rotates within the chamber 26 (FIG. 3) depending upon the ingress and egress of fluid into and out of the chamber. As show in FIG. 3, the housing assembly includes a first and a second opening 70 and 72 for allowing fluid into and out of the chamber 26. It will be appreciated that as fluid flows through opening 70 and is drawn out of opening 72, an inlet is thereby defined by opening 70 and an outlet by opening 72. Such movement of the fluid causing pressures against the vanes assembly 50 and the vane assembly causes the rotor 20 to move in the same direction. To reverse direction of the rotor 20, the roles of openings 70 and 72 are reversed such that the opening 70 becomes the outlet and opening 72 becomes the inlet.

As is well known, rotary vane actuators of the type disclosed herein may include a plurality of ports on the rotor. Each of these ports is controlled by an electro-mechanical mechanism by the operator known as servomotors. The servo motors control a series of leaves located on the rotor and designed as numeral 80 which seal the ports upon activation and de-activation of the servo motors by the operators.

The vane assembly 50 is secured to the rotor 20 by a plurality of bolts which are threaded through the vanes 52 and 54 and into the rotor 20 which has a compatible threaded openings. Each of the vanes 52 and 54 are secured in this manner to the rotor. It will be appreciated that other methods of securing the vanes assembly 50 to the rotor 20 are possible and within the scope of the instant invention.

As shown in FIGS. 1–3, the end plates 22 are secured to the stator housing 16 through bolt and nuts. With the addition of seals, as described below, the stator housing 16 and the end plates 22 are sealed to one another. The stator housing 16 has a machined face on either side and the end plates 22 have a compatible machined face to facilitate the seal.

In addition to the usual O-ring seals, the sealing assembly 14 includes three additional assemblies to promote three-dimensional sealing of the chamber 26. With respect to FIG. 1, there is shown a plurality of O-ring seals designed generally 90 as is conventional with rotary vane actuator devices. Additionally, the stator 30 and the rotor 20 include seal packs generally designated by the numeral 100.

Figure 6:
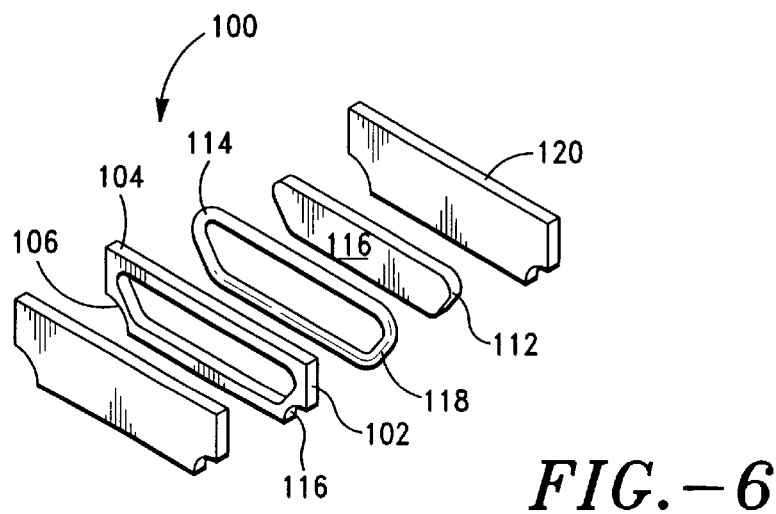
FIG. 6 is an enlarged perspective plan view illustrating the seal and rotor pack assemblies in exploded view.

As shown in FIG. 6, each of the seal packs 100 fits in and is connected to their respective groove, 36 and 56. Each seal pack 100 includes a vane seal 102. The vane seal 102 is donut shaped and made from polyurethane. It will be appreciated that other configurations and materials are all within the scope of the invention. For example other materials include thermoplastics and thermoset particles.

Figure 7:
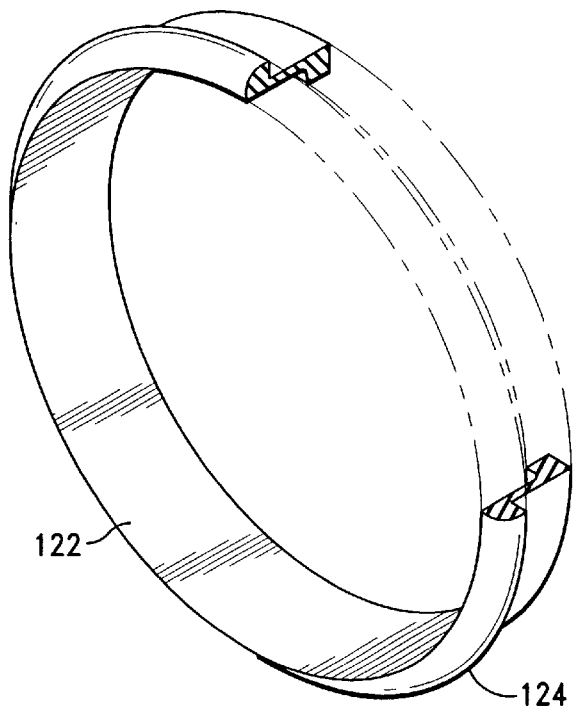
FIG. 7 is a partial sectional view of the end plate seal in perspective.

The outer surface 104 of the vane seal 102 has a notch on either end and in profile appears as arcuate surface 106. As will appreciated more fully below this accommodates each of the end plate seals 122 (FIG. 7). Also by providing two notches one need not be concerned with matching a particular end plate seal to a particular seal pack. Consequently, manufacturing is relatively simple and each seal pack can be made the same. In this way only one vane seal 102 need to be made to facilitate both rotor and stator seal packs 100.

The donut opening (illustrated clearly in FIG. 2) of the vane seal 102 includes a suspension system 110 for the seal pack 100. The suspension system 110 illustrated in FIGS. 5 and 6 include a stabilizer mechanism 112 and a shock absorber 114. In the preferred embodiment, the stabilizer mechanism 112 comprises aluminum filler plate 116 and the shock absorber 114 comprises an O-ring 118 wrapped tightly around the outer surface of the aluminum filler plate 116.

The seal packs 100 include backing plates 120 on either side of the seal 102 which add rigidly to the backing plates 120 and the seal 102 as well as the suspension system 110. The backing plates 120 are allowed to move small amounts but are constrained from large movement by the inside of the chamber including the stator groove 36, rotor groove 56, the stator housing 16, the end plates 22, the rotor 20, and the end plate seals 122. The backing plates are made from an engineering plastic or other materials, which function similarly.

Figure 5:
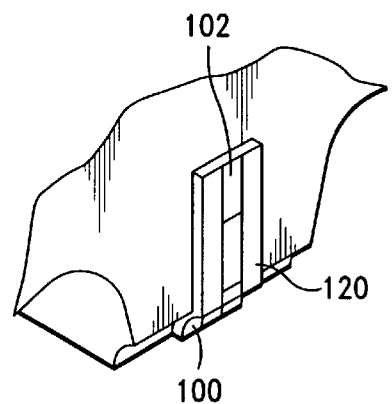
FIG. 5 is an enlarged perspective view of the assembled stator seal pack.

Each of the aluminum filler plate 116 and the backing plates 120 include a notch similarly shaped and compatibly positioned so that it matches the notch 106 with a similar arcuate surface as best shown in FIGS. 5 and 6. This allows the suspension system to maintain the seal in the chamber 26 during rotation.

Figure 4:
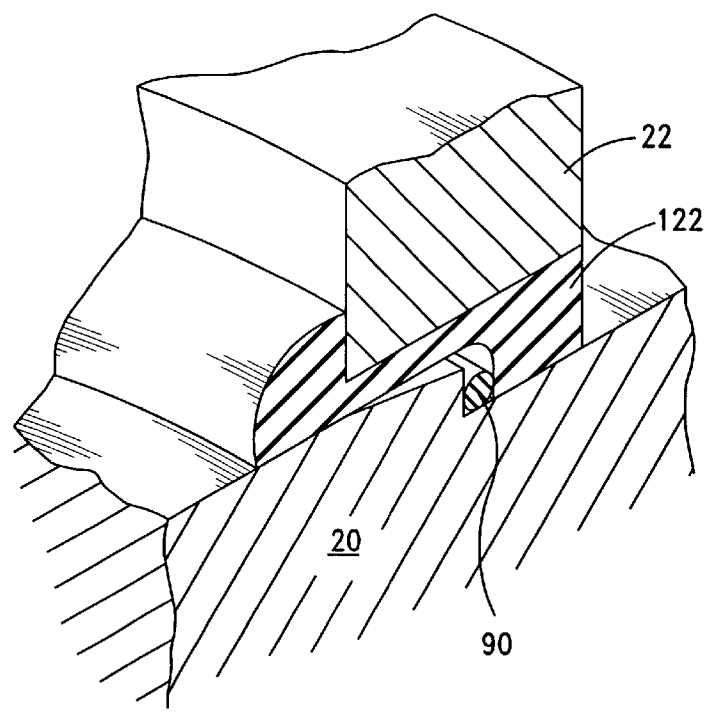
FIG. 4 is an enlarged perspective view of the end plate seal illustrating the seal being at least partially inside the chamber.

The end plates 22 include an end plate seal 122 between the end plates 22 and the rotor 20. As clearly shown in FIG. 4, the end plate seal 122 is fit between the rotor 20 and the end plates 22 and at least of portion of the end plate seal 122 is within the chamber 22. And, at least a portion of the end plate seal 122 is out of the chamber 26 and secured to the end plate 22. The end plate seals 122 are fit over the rotor 20. The end plate seals 122 rotates with the rotor 20 or remains stationary during rotation of the rotor 20. Alternatively, the end seal plates 122 may be fixed to the end plates 22 through an opening in the end plate seals 122. In any case, the end plate seals 122 is fit to either the rotor 20 or the end plates 22 so that even under high pressure and rotation it does not fall into the chamber 26. This is similarly true under static conditions as well.

As best shown in FIG. 7, the end plate seal 122 has a lipped surface 124. The lipped surface 124 is compatibly arcuate with the arcuate surfaces of the notch 106. This allows the notch 106 of the rotor seal pack 100 to ride along the lipped surface 124 during rotation of the rotor 20. The suspension system 110 flexes and maintains the contact with the end plate seals 122 during rotation of the rotor 20 despite various imperfections of the contacting surfaces of the seal packs 100 and the end plate seals 122.

Similarly the stator seal pack notch 106 engages the lipped surface of the end plate seals 122. It will be appreciated that both ends of the stator seal pack and the rotor seal pack 100 has notches at either end to accommodate each end plate seal 122.

By maintaining contact the chamber seal is maintained and no fluid can leak either between the ports or out to the environment. In other words, the possible leak paths are blocked three dimensionally. More particularly, each of leak paths between the end plate seals 122 and the seal pack 100 and the rotor 20 and between the end plate seals 122 and the seal pack 100 and the end plate 22 are three dimensionally blocked.

Figure 8:
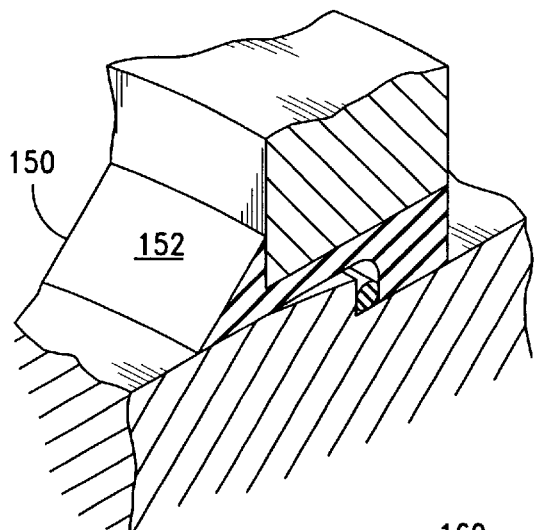
FIG. 8 illustrates an alternative end plate seal at least partially within the chamber.
Figure 9:
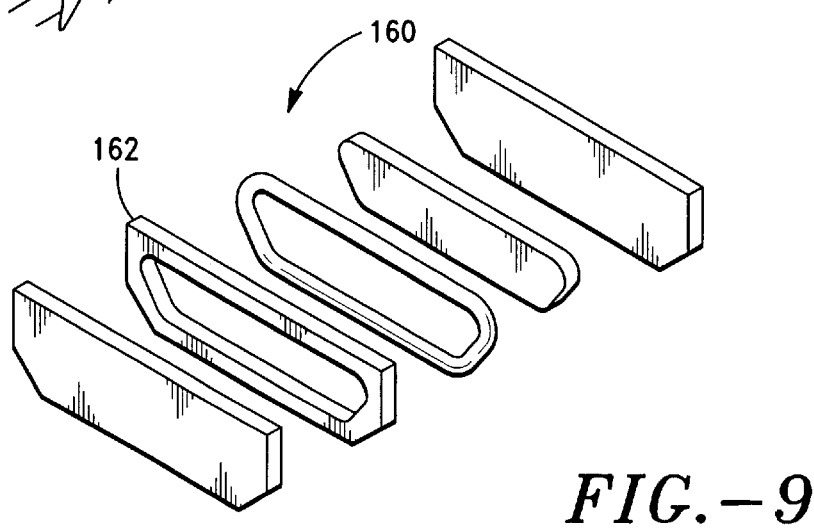
FIG. 9 illustrates an alternative seal pack assembly compatible with the end plate seal of FIG. 8.

As illustrated in FIGS. 8 and 9, there is shown an alternative sealing assembly including alternative end plate seals 150 and an alternative seal pack 160. In this embodiment, the outer surface 152 of the end plate seals 150 is flat and not arcuate. Similarly, the vane seal 162 of seal pack 160 has a compatible outer surface 164, which is flat. The two outer surfaces 152 and 164 must be at virtually the same length to prevent leakage. Contact throughout the adjoining lengths of the outer surfaces 152 and 164 must be maintained to prevent the development of leak paths the chamber 26.

Clearly, making the lengths exactly the same or virtually exactly the same is difficult and costly. Even small amounts of leakage into the environment from the chamber are unacceptable in sensitive environmental areas. Thus, while the embodiment shown in FIGS. 8 and 9 is functional and within the scope and spirit of the invention, it is not necessarily the preferred embodiment.

The arcuate lengths of the lipped surfaces 124 on the end plate seal and the compatible arcuate surfaces of the notches 106 and allows a certain amount of tolerance not present in flat structures. In combination with the suspension system 110, the arcuate surfaces allow the dynamic seal to hold throughout movement of the rotor 20. Even with irregularities in the arcuate surfaces and slight length variations, the arcuate surfaces maintain contact and cause the seal to be maintained three dimensionally. By maintaining contact a complete seal is assured.

Additionally, the arcuate length is also a preferred version because they are longer and therefore a greater amount of surface area contacts. This provides the three dimensional seal with a greater amount of surface area and therefore a greater tolerance in movement while still maintaining the seal contact.

The end seal is made from a compatible plastic material, such as Delrin® or Kynar® which when in contact with each of the vane seals 102 to form a fluid proof seal. Thus, whether static or dynamic, the seals, when in contact maintain a fluid proof seal with all sealing surfaces being plastic. Each potential leak path is thus blocked appropriately by a fluid proof seal for three dimensional sealing because the vane seal is continuously in contact with the end plate seal as the rotor 20 rotates through the chamber 26.

As described above, a fluid proof seal blocks all possible three leak paths through the rotary vane actuator device 10. The three possible leak paths are from port to the port, from the port to the environment and from the chamber 26 to the environment. Each of these potential paths is blocked by at least one of the seals described above.

In operation, the device 10 is installed and assembled as part of a robotic arm or other such device. The seal packs 100 are assembled in their respective grooves 36 and 56 and affixed thereto. The end plate seals 122 are set in place between the stator housing 16, the rotor 20 and each end plate plates 22 with at least a portion of the end plate seals being within the chamber 26. The remaining portion of the end plate seal being outside the chamber 26 and being trapped by the mating of the end plate seals 22, the rotor 20 and the stator housing 16.

As noted above, the housing assembly 12 has at least two openings 70 and 72 as clearly shown in FIG. 3. Each of the openings 70 and 72 may serve alternatively as an inlet or outlet depending upon the direction of rotation desired. For example if it is desired to rotate the rotor 20 from opening 70 towards opening 72, the fluid under pressure (approximately 3000 PSI) is sent through opening 70 and retracted from opening 72. The flow of the fluid against the first vane 52 forces the second vane 54 to rotate towards the second opening 72.

As noted above, the stator and rotor seal packs 100 maintain continuous sealing contact with the end plate seals 122 thereby creating a constant three-dimensional seal even during rotation. The suspension system 110 holds the contact despite the irregularities in surface areas or movement of the rotor.

The rotational movement continues until the second vane 54 rotates against the abutment surface defined by the outside of the stator 30. This gives the rotor 20 approximately 270°. It will be appreciated that similar rotation is possible in the reverse direction by alternating the inlet and outlet. Thus to reverse the rotational direction of the rotor 20, the inlet is defined by opening 72 and the outlet by opening 70.

While the foregoing detailed description has described several embodiments of the rotary vane actuator in accordance with this invention, it is to be understood that the above description is illustrative only and not limiting of the disclosed invention. Particularly, the rotary vane actuator need not include any particular arcuate shaped mating sealing surface, but rather the arcuate shaped mating surfaces of each sealing member provide the tolerance and flexibility preferred for manufacturing using traditional methods for same. Additionally, the while plastic sealing elements need not be used exclusively, they are preferred because of the flexibility and durability of the sealing elements in the design provided herein. While plastic sealing elements may be used in other designs their effectiveness is in question. This design represents an advance so that such plastic materials may be used. Thus, the invention is to be limited only by the claims as set forth below.

What is claimed is:

1. A rotary vane actuator for a submersible robotic arm, comprising:

an actuator housing assembly;

a cylindrical rotor including a first shaft element and a second shaft element, each shaft element having a diameter and linear depth smaller than the diameter of the remaining cylindrical element of the rotor and a set of machined depressions in the remaining cylindrical element of the rotor;

a removable vane assembly for facilitating the movement of the rotor, the removable vane assembly fitting into the machined depressions of the rotor and a removable multi-element seal assembly, the vane assembly including removable vane members, the removable multi-element seal assembly defining a sealing mechanism including a front plate, a notched hollow seal, a shock absorber, a filler plate and a back plate to prevent fluid by-pass;

a cylindrical stator housing having a central opening having a center, the cylindrical stator including a stator being integral with stator housing and being directed downward from the interior surface into the center of the central opening of the stator housing that securely holds a removable multi-element seal assembly in place, wherein the removable multi-element seal assembly is a sealing mechanism that comprises a front plate, a notched hollow seal, a shock absorber, a filler plate and a back plate to prevent fluid leakage;

a first and a second cylindrical end plate, positioned on either side of the stator housing and bolted to the actuator housing assembly, whose compilation creates a chamber for encapsulating the rotor; and an O-ring seal and an end plate seal between the cylindrical shaft element of the rotor and the central opening of the end plate for preventing fluid from leaking out of the chamber.

2. The rotary actuator as recited in claim 1, wherein the set of machined depressions consists of a first and a second depression, each having sufficient length, width and depth to interchangeably accept either removable vane members of the vane assembly.

3. The rotary actuator as recited in claim 1, wherein each of the removable vane members of the vane assembly are secured to the rotor by means of threaded bolts that are threaded through each vane member and received by a compatible set of uniformly spaced threaded holes in a respective one of the first and second machined depressions of the rotor.

4. The rotary actuator as recited in claim 1, when the removable vane members of the vane assembly are secured to the rotor and properly positioned in the machined depressions of the rotor, the lateral surfaces of the first and second removable vane members create a space of sufficient width to accommodate and securely hold the removable seal assembly in place.

5. The rotary actuator as recited in claim 1, wherein each cylindrical shaft element of the rotor is inserted into the central opening of the end plate insuring that the vane assembly is properly aligned with the stator and allowing the rotor to turn freely in both a clockwise direction and counterclockwise direction relative to the stator.

6. The rotary actuator as recited in claim 1, wherein the stator housing further comprises a first and a second machined surface that is compatible with the machined of each of the end plates.

7. The rotary actuator as recited in claim 1, wherein the stator that is directed inward towards the center of the central opening stops the rotor from continuously turning in either a clockwise direction or counterclockwise direction.

8. The rotary actuator as recited in claim 1, wherein the actuator housing also includes a number of fluid inlets used to introduce fluid into the chamber while other fluid inlets draw the fluid from the chamber.

9. The rotary actuator as recited in claim 1, wherein the fluid flowing through at least one inlet into the side of the chamber is simultaneously drawn out of the other side of the chamber thus, forcing the vane of the rotor to move in a direction away from the flow of fluid.

10. The rotary actuator as recited in claim 1, wherein the fluid flowing through at the chamber is reversed the vane of the rotor will be forced to move in the opposite direction away from the flow of fluid.

* * * * *